(12) United States Patent
Ashbrook et al.

(10) Patent No.: US 9,069,738 B2
(45) Date of Patent: Jun. 30, 2015

(54) METHOD AND APPARATUS FOR DETERMINING REPRESENTATIONS OF ABBREVIATED TERMS FOR CONVEYING NAVIGATION INFORMATION

(75) Inventors: Daniel L. Ashbrook, Sunnyvale, CA (US); David H. Nguyen, Sunnyvale, CA (US)

(73) Assignee: Nokia Technologies Oy, Espoo (FI)

(*) Notice: Subject to any disclaimer, the term of this patent is extended or adjusted under 35 U.S.C. 154(b) by 130 days.

(21) Appl. No.: 13/571,478

(22) Filed: Aug. 10, 2012

(65) Prior Publication Data
US 2014/0047364 A1 Feb. 13, 2014

(51) Int. Cl.
G06F 3/048 (2013.01)
G06F 17/22 (2006.01)
G01C 21/36 (2006.01)

(52) U.S. Cl.
CPC ........ *G06F 17/2264* (2013.01); *G01C 21/3673* (2013.01)

(58) Field of Classification Search
CPC .................. G06F 17/2264; G01C 21/3673
USPC ............... 709/815; 701/440; 715/815, 764
See application file for complete search history.

(56) References Cited

U.S. PATENT DOCUMENTS

| | | | |
|---|---|---|---|
| 4,435,086 A | 3/1984 | Kato | |
| 6,076,039 A * | 6/2000 | Kabel et al. | 701/532 |
| 6,212,474 B1 * | 4/2001 | Fowler et al. | 701/440 |
| 6,452,597 B1 * | 9/2002 | Goldberg et al. | 345/472 |
| 7,421,275 B1 * | 9/2008 | Hancock et al. | 455/456.1 |
| 2005/0143914 A1 * | 6/2005 | Yamada et al. | 701/211 |
| 2006/0195255 A1 * | 8/2006 | Kim | 701/208 |
| 2009/0044101 A1 * | 2/2009 | Vincent, III | 715/234 |
| 2009/0164115 A1 * | 6/2009 | Kosakowski et al. | 701/201 |
| 2011/0046880 A1 | 2/2011 | Balardeta et al. | |
| 2011/0244882 A1 * | 10/2011 | Hancock | 455/456.1 |
| 2011/0320114 A1 * | 12/2011 | Buxton et al. | 701/200 |

FOREIGN PATENT DOCUMENTS

WO    WO 03/079162 A2    9/2003

OTHER PUBLICATIONS

Eckler, "Labeling a List With Unique Identifiers" Word Ways 33.3 (2000): 218-220. http://digitalcommons.butler.edu/cgi/viewcontent.cgi?article=4483&context=wordways. Web. Feb. 5, 2013.*

Eckler, "Labeling a List With Unique Identifiers" Word Ways 33.3 (2000): 218-220. http://digitalcommons.butler.edu/cgi/viewcontent.cgi?article=4483&context=wordways. Retrieved from the Web. Feb. 5, 2014.*

Gotlib, "Selected Methodological Aspects of Crearion of Cartographi Presentation for the Needs of Mobile Systems", Conference Proceedings, Nov. 15-21, 2009, pp. 1-12, International Cartographic Association.

* cited by examiner

*Primary Examiner* — Jennifer To
*Assistant Examiner* — John Repsher, III
(74) *Attorney, Agent, or Firm* — McClure and Associates, PLLC

(57) ABSTRACT

A method, apparatus, and computer program product are provided to facilitate determining abbreviations of a term for conveying navigation information based on one or more other terms of the navigation information. In the context of a method, one or more terms for conveying navigation information are determined. The method may also determine at least one abbreviation for at least one term of the one or more terms so that the at least one abbreviation is unambiguous with respect to other one or more of the one or more terms. The method may also cause a presentation of at least one representation of the at least one abbreviation.

14 Claims, 11 Drawing Sheets

METHOD AND APPARATUS FOR DETERMINING REPRESENTATIONS OF ABBREVIATED TERMS FOR CONVEYING NAVIGATION INFORMATION

TECHNOLOGICAL FIELD

An example of the present invention relates generally to determining the representation of information provided on a display and, more particularly, to a method, apparatus, and computer program product for determining the representations of abbreviated terms for conveying navigation information.

BACKGROUND

Service providers and device manufacturers are continually challenged to provide compelling services and devices to consumers. One area of development has been providing navigation services and/or devices for providing the representations of navigation information. As the popularity of mobile devices grows, more consumers carry with them some type device that is able to provide representations of navigation information. However, service providers and device manufacturers face significant challenges in providing representations of the navigation information in ways that are easily understandable by the consumers.

BRIEF SUMMARY

A method, apparatus, and computer program product are therefore provided for determining one or more representations of one or more abbreviations of one or more terms for conveying navigation information. In an embodiment, the method, apparatus, and computer program product determine a representation of at least one abbreviation of at least one term for conveying navigation information. The at least one abbreviation may be determined in such a way as to differentiate the at least one term from the one or more terms. By way of example, the one or more terms may be associated with street names. An abbreviation of one of the streets names may be determined so that the abbreviation is unambiguous with respect to other one or more of the one or more terms, and a representation of the street name may be presented to a user at a user interface in association with navigation information such that the user can differentiate the street name from the other street names.

According to an embodiment, a method comprises determining one or more terms for conveying navigation information. The method also comprises determining at least one abbreviation for at least one term of the one or more terms so that the at least one abbreviation is unambiguous with respect to other one or more of the one or more terms. The method further comprises causing a presentation of at least one representation of the at least one abbreviation.

The method may also determine one or more letters associated with the at least one term that differentiates the at least one term from the one or more terms. In this embodiment, the at least one abbreviation for the at least one term is based on the one or more letters. In an embodiment, the one or more letters may be a fewest number of starting letters of the at least one term that differentiates the at least one term from the one or more terms. The method may also cause a presentation of at least one representation of at least one navigation guidance instruction comprising the at least one abbreviation. The method may also determine a subset of the one or more terms, including the at least one term, associated with a route segment. In this embodiment, the at least one abbreviation for the at least one term may be based on the subset of the one or more terms out of the one or more terms. In an embodiment, the route segment may be a segment of the navigation route between two navigation guidance instructions. In an embodiment of the method, the one or more terms may comprise one or more streets forming a navigation route, one or more cross streets along the navigation route, one or more landmarks along the navigation route, one or more points-of-interest along the navigation route, or a combination thereof.

According to another embodiment, an apparatus comprises at least one processor, and at least one memory including computer program code for one or more computer programs, the at least one memory and the computer program code configured to, with the at least one processor, cause the apparatus to at least determine one or more terms for conveying navigation information. The at least one memory and the computer program code are also configured, with the at least one processor, to cause the apparatus to determine at least one abbreviation for at least one term of the one or more terms so that the at least one abbreviation is unambiguous with respect to other one or more of the one or more terms. The at least one memory and the computer program code are also configured, with the at least one processor, to cause the apparatus to cause a presentation of at least one representation of the at least one abbreviation.

In an embodiment, the at least one memory and the computer program code may also be configured, with the at least one processor, to cause the apparatus to determine one or more letters associated with the at least one term that differentiates the at least one term from the one or more terms. In this embodiment, the at least one abbreviation for the at least one term may be based on the one or more letters. In an embodiment, the one or more letters may be a fewest number of starting letters of the at least one term that differentiates the at least one term from the one or more terms. The at least one memory and the computer program code may also be configured, with the at least one processor, to cause the apparatus to cause a presentation of at least one representation of at least one navigation guidance instruction comprising the at least one abbreviation. In an embodiment, the at least one memory and the computer program code may also be configured, with the at least one processor, to cause the apparatus to determine a subset of the one or more terms, including the at least one term, associated with a route segment. In this embodiment, the at least one abbreviation for the at least one term is based on the subset of the one or more terms out of the one or more terms. In an embodiment, the route segment may be a segment of the navigation route between two navigation guidance instructions. In an embodiment, the one or more terms may comprise one or more streets forming a navigation route, one or more cross streets along the navigation route, one or more landmarks along the navigation route, one or more points-of-interest along the navigation route, or a combination thereof.

According to another embodiment, a computer program product comprising at least one non-transitory computer-readable storage medium having computer-readable program instructions stored therein, the computer-readable program instructions comprising program instructions configured to determine one or more terms for conveying navigation information. The computer-readable program instructions also include program instructions configured to determine at least one abbreviation for at least one term of the one or more terms so that the at least one abbreviation is unambiguous with respect to other one or more of the one or more terms. The computer-readable program instructions also include program instructions configured to cause a presentation of at least one representation of the at least one abbreviation.

In an embodiment, the computer-readable program instructions also may include program instructions configured to determine one or more letters associated with the at least one term that differentiates the at least one term from the one or more terms. In this embodiment, the at least one abbreviation for the at least one term is based on the one or more letters. In an embodiment, the one or more letters may be a fewest number of starting letters of the at least one term that differentiates the at least one term from the one or more terms. In an embodiment, the computer-readable program instructions also may include program instructions configured to cause a presentation of at least one representation of at least one navigation guidance instruction comprising the at least one abbreviation. In an embodiment, the computer-readable program instructions also may include program instructions configured to determine a subset of the one or more terms, including the at least one term, associated with a route segment. In this embodiment, the at least one abbreviation for the at least one term may be based on the subset of the one or more terms out of the one or more terms. In this embodiment, the route segment may be a segment of the navigation route between two navigation guidance instructions.

According to yet another embodiment, an apparatus comprises means for determining one or more terms for conveying navigation information. The apparatus also comprises means for determining at least one abbreviation for at least one term of the one or more terms so that the at least one abbreviation is unambiguous with respect to other one or more of the one or more terms. The apparatus further comprises means for causing a presentation of at least one representation of the at least one abbreviation. In an embodiment, the apparatus may also comprise means for determining one or more letters associated with the at least one term that differentiates the at least one term from the one or more terms, with the at least one abbreviation for the at least one term being based on the one or more letters. The apparatus may also comprise means for causing a presentation of at least one representation of at least one navigation guidance instruction comprising the at least one abbreviation. The apparatus may also comprise means for determining a subset of the one or more terms, including the at least one term, associated with a route segment, with the at least one abbreviation for the at least one term being based on the subset of the one or more terms out of the one or more terms.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DETAILED DESCRIPTION OF SOME EMBODIMENTS

Examples of a method, apparatus, and computer program product for presenting one or more representations of one or more abbreviations of one or more terms for conveying navigation information are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

As used herein, the term navigation information refers to any information and/or data that is associated with navigational functionality, such as location data, route data, geographical data, movement data, points-of-interest data, and the like. The navigation information further includes, for example, navigation guidance instructions that provide instructions to a user regarding following a route within the navigation information. The navigation guidance instructions may include terms for conveying the navigation information; specifically for conveying the navigation guidance instructions. Further, although various embodiments are described with respect to street names as the one or more terms used for conveying navigation information, it is contemplated that the approach described herein may be associated with any term that is able to convey navigation information, such as one or more labels constituting, at least in part, the navigation information, one or more portions or the entirety of navigation guidance instructions, and the like. Further, although various embodiments are described with respect to letters of the terms for conveying the navigation information, it is contemplated that the approach described herein may be associated with any character that makes up the terms for conveying navigation information, such as one or more numbers or any other characters.

Figure 1:
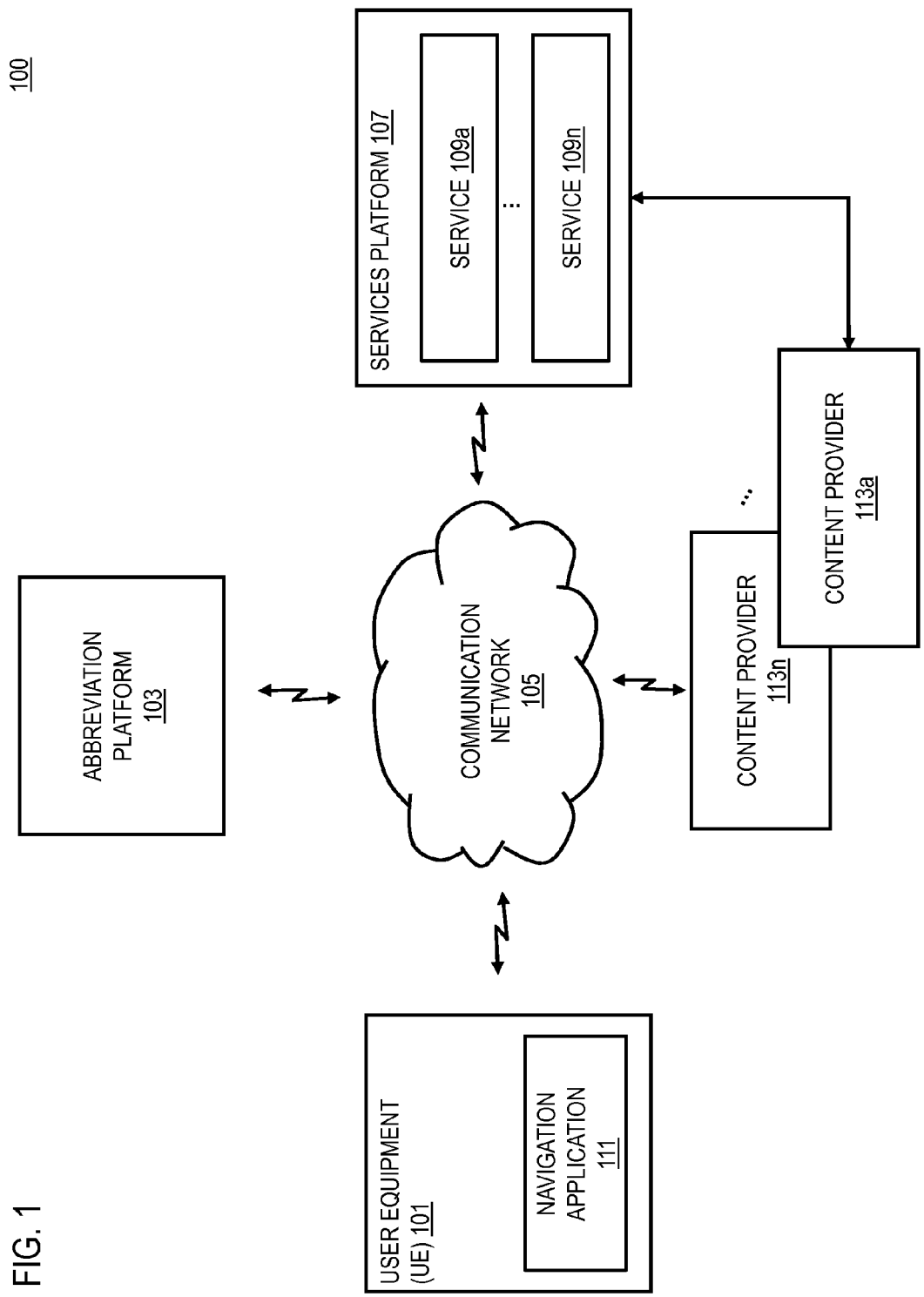
FIG. 1 is a diagram of a system capable of presenting one or more representations of one or more abbreviations of one or more terms for conveying navigation information, according to an embodiment.

FIG. 1 is a diagram of a system capable of presenting one or more representations of one or more abbreviations of one or more terms for conveying navigation information, according to an embodiment. As addressed above, the number of users that carry with them one or more devices that are able to provide navigation information continues to increase.

Whether the device is a dedicated navigation device or a mobile device that is able to run one or more applications that provide navigation information (e.g., a cell phone, PDA, etc.), these devices allow users to access navigation information at various locations and settings. As technology increases, these devices are able to be smaller and smaller. For example, besides mobile phones, other devices such as wristwatches, glasses, etc. now have the functionality of being able to provide navigation information. Common to all devices that are able to provide navigation information, the information must be presented so that it is not difficult for a user to see and understand. Particularly with smaller devices, the devices must present enough information to be practical for providing navigation information yet present the information in a way that the user can quickly and easily understand what is being presented, such as by quickly glancing at representations of the navigation information.

By way of example, the navigation information may include street names, representations of which are presented at a user interface of a device. Depending on various factors associated with the device, such as the display size, the display resolution, etc., certain street names may not be presentable on a single line at a certain size (e.g., font size). To account for this, the font size may be reduced. However, reducing the font size may reduce the ability for certain users to read the representation of the street name. Alternatively, the representation of the street name may be broken into multiple lines. However, this may lead to confusion regarding the name of the street, particularly when the user is unfamiliar with the area and/or unfamiliar with, for example, regional naming styles with respect to street names. Even further, in some cases, the representation of the street name may be reduced in size and broken into multiple lines. These attempts to display the representations of the navigation information result in situations where a user may be unable to understand the navigation information, such as in a situation where the user is driving and viewing the navigation information is not the user's primary responsibility.

To address these problems, a system 100 of FIG. 1 introduces the capability to present one or more representations of one or more abbreviations of one or more terms for conveying navigation information. Accordingly, for example, rather than breaking a representation of a term into multiple lines of text, or reducing the size of the representation, the system 100 introduces the ability to present a representation of an abbreviation of the term that presents a representation of the amount of the term that is needed to disambiguate the term from other representations of terms associated with the navigation information. The system 100 is able to determine one or more terms for conveying navigation information. The one or more terms may be any type of information that represents navigation information, such as names of streets, neighborhoods, towns, cities, counties, states, countries, etc. that are used to describe a geographic area with respect to the navigation information. The one or more terms may also include names of landmarks, points-of-interest, buildings, traffic circles, and the like. In an embodiment, the terms may also represent portions and/or the entirety of navigation guidance instructions, such as the terms Left, Right, Turn, Straight, North, South, East, West, etc. The system 100 further determines at least one abbreviation for at least one term of the one or more terms so that the at least one abbreviation is differentiated with respect to other one or more of the one or more terms. The abbreviation differentiates the at least one term from the other one or more terms conveying the navigation information. Upon determining the abbreviation, the system 100 introduces the capability to present at least one representation of the at least one abbreviation at a display associated with a device such that a user can view the representation of the abbreviation and understand the term the abbreviation represents.

As shown in FIG. 1, the system 100 comprises a user equipment (UE) 101 having connectivity to an abbreviation platform 103 via a communication network 105. By way of example, the communication network 105 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, near field communication (NFC), Internet Protocol (IP) data casting, digital radio/television broadcasting, satellite, mobile ad-hoc network (MANET), and the like, or any combination thereof. However, in an embodiment, the abbreviation platform 103 may be embodied in the UE 101 such that the communication network is not necessary for the abbreviation platform 103 to communicate and interact with the UE 101 and software and/or hardware at the UE 101.

The UE 101 is any type of mobile terminal, fixed terminal, or portable terminal including a mobile handset, station, unit, device, mobile communication device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.).

In an embodiment, the UE 101 may include a navigation application 111 that processes and determines navigation information. The representations of the navigation information may then be presented at a user interface of the UE 101 (e.g., at a display of the UE 101). However, the UE 101 may include more than one application 111 that provides navigation information at the UE 101, or may include no applications 111, such as in the case where the UE 101 corresponds to a personal navigation device that is hardware based. In an embodiment, the navigation information alternatively may be provided by one or more services 109a-109n (collectively referred to as services 109) associated with the services platform 107 and/or by one or more content providers 113a-113n (collectively referred to as content providers 113). Alternatively, or in addition, the services 109 and/or content providers 113 may provide only parts of the navigation information, such as the names of the streets, landmarks, cities, counties, etc. to the abbreviation platform 103 and/or the navigation application 111 at the UE 101.

As discussed above, the abbreviation platform 103 determines one or more terms for conveying navigation information. For purposes of simplifying the explanation, the discussion of the terms may focus on names of streets (street names) that constitute part of the navigation information. The abbreviation platform 103 determines abbreviations for the street names and presents representations of the abbreviations at a user interface of the UE 101 so that the user of the UE 101 may differentiate the street names from other street names. The abbreviations are based on an entirety of the street names so as to differentiate the street name from the other street names. By way of example, where a user interface presents representations of street names, the representations may instead be abbreviations of the street names that are determined in such a way so as to differentiate the street names associated with the representation from each other.

The entirety of the street names may have various granularities. For example, an entirety of the street names may correspond to the street names that are currently and/or dynamically represented at the user interface. Thus, as the representations of the streets names change at the user interface, the abbreviations of certain street names may also change to continuously differentiate the street name from the other represented street names. In an embodiment, the entirety of street names may be a subset of the above entirety. For example, when there is an active navigation route, the entirety of the street names that are used to determine the abbreviations may be the street names that are associated with the route (e.g., form the route and cross the route). Even further, the entirety of street names may be a subset of the street names based on segments of the route. For example, where a route is divided by two navigation guidance instructions, the entirety of street names that are used to determine the abbreviations for a street name may be the street names that are associated with the segment of the route (e.g., form the segment of the route and cross the segment of the route). Thus, although the abbreviations are described as being based on the entirety of the street names, the entirety may have different levels of specificity/granularity. In an embodiment, the abbreviation platform 103 may determine the level of specificity/granularity that is used to determine the abbreviations based on one or more factors, such as the display size, the display resolution, the type of UE 101, etc. A user of a UE 101 may also set preferences regarding the level of specificity/granularity that is used to determine the abbreviations. Such preferences may be based on, for example, whether the user is familiar with a geographical area, whether the user speaks or reads the language the terms are represented in, etc.

In an embodiment, the abbreviation platform 103 determines one or more letters associated with at least one street name that differentiates the street name from the other street names that have representations presented at a user interface. For example, if there are representations of three street names presented at a user interface and each street name begins with a different letter (e.g., A, B, and C), the abbreviation platform 103 may determine the abbreviation for the street name beginning with A is simply A. However, where more than one street name begins with the same letter (or letters) the abbreviation may be determined based on the first number of letters that are identical to another street name in addition to the first letter that is not identical to the other street name. Thus, where there are two street names: Abbey Pl and Abby Rd, the abbreviations for the two street names are Abbe and Abby, respectively. Additionally, the one or more letters that make up the abbreviation may be the fewest number of the starting letters of the street name that differentiates the street name from the other street names (such as four letters for the above example).

In an embodiment, the abbreviation platform 103 may determine one or more abbreviations for one or more letters and/or terms within a previously determined abbreviation of a term. Thus, the at least one abbreviation may include sub-abbreviations. By way of example, two streets associated with conveying navigation information may include Saint John Park Street and Saint John Hill Way. The fewest number of starting characters that differentiate the two streets is ten (excluding spaces) resulting in Saint John P and Saint John H. Thus, the length of the abbreviation based on the fewest number of characters may still result in a long term that may need to be reduced in size and/or split into multiple lines of text. Accordingly, the abbreviation platform 103 may determine one or more abbreviations within the abbreviation (e.g., sub-abbreviations) to further reduce the length of the abbreviation. According to the above, Saint may be abbreviated as St. and John may be abbreviated as J. As a result, the two abbreviations that would differentiate Saint John Park Street and Saint John Hill Way may be St. J. P. and St. J. H., using the fewest number of starting letters and using the sub-abbreviations.

The sub-abbreviations may be based on one or more predetermined definitions for one or more terms. In an embodiment, the sub-abbreviations may be based on abbreviating one or more affixes (e.g., prefixes and/or suffixes) associated with a word. For example, the term Misunderstanding, such as in the street name Misunderstanding Road, may be abbreviated M.understand'g as needed to differentiate the street name from one or more other terms for conveying navigation information. Any type of punctuation mark may be used to indicate the style of the abbreviation, such as the period and the apostrophe used in the above example.

In an embodiment, terms used for conveying navigation information, such as street names, may be formatted according to specific formats associated with a specific region and/or naming convention. For example, street names are generally composed of a specific and a generic. The street name Roger Court includes the specific of Roger and the generic of Court. Where two street names begin with the same specific but have different generics, such as Roger Court and Roger Way, the street names may be abbreviated as discussed above by abbreviating Roger to R followed by the least number of starting letters of the generic to differentiate the two street names (e.g., C and W) resulting in R. C and R. W. Further, instead of abbreviating Court and Way based on the first letter that differentiates the two, the abbreviation may include the customary abbreviation (if any) for the generic (e.g., Ct. and Way). Thus, the resulting abbreviations for Roger Court and Roger Way may be R. Ct. and R. Way based on the fewest number of starting letters, at least initially to determine the root abbreviation, and one or more sub-abbreviations of terms based on the format of the terms.

The abbreviation platform 103 may present representations of the terms for conveying navigation information at a user interface of a UE 101 to, for example, conserve space on the user interface, fit the terms on the user interface without having to shrink the representations and/or without having to have multiple lines to include all of the terms. Thus, where a user interface presents a representation of a geographical area, including, for example, one or more streets within the area, the representations of the abbreviations of the street names may be included in the user interface rather than the full street names in order to conserve space within the user interface and/or in order to prevent the representations of the street names being too small to read or span multiple lines.

The representations of the abbreviations may also be presented within representations of navigation guidance instructions. For example, where a user is following a route and receiving instructions (e.g., navigation guidance instructions) from a navigation application 111, the navigation guidance instructions determined by the navigation application 111 may be represented by including abbreviations so that the user can quickly and easily understand the instructions. Thus, for example, rather than a user having to look for the road Abbots Stone Way, the user can simply look for the road beginning with the letter A because the representation of the street name Abbots Stone Way may be based on the abbreviation A rather than the entire street name.

As discussed above, the abbreviation platform 103 may determine abbreviations for the terms conveying navigation information based on which representations of the terms are currently presented at a user interface. Thus, all of the terms presented at a user interface may be represented by their abbreviations to distinguish the terms from the other terms presented at a user interface. However, in an embodiment, the abbreviations may be determined based on one or more subsets of the terms.

For example, where a user is following a route within the navigation information, whether a user can differentiate a street name that is along the route or crosses the route with a street name that is not along the route or does not cross the route is less important. In other words, although two street names (e.g., Abbey Ln and Abby Pl) may have representations presented at a user interface at the same time, if the user will not come across Abby Pl in the real world while driving along the route (e.g., Abby Pl is not along the route and does not cross the route), it is not as important to distinguish Abbey Ln from Abby Pl in the abbreviations. Thus, if Abby Pl is the only street name that begins with the letter A that is both presented within the user interface and associated with the route, the abbreviation platform 103 may determine the abbreviation for Abbey Ln is simply A by not considering Abby Pl in determining the abbreviation.

The abbreviation platform 103 can take this distinction one step further. The subset of terms used in determining abbreviations may be based on route segments along a navigation route. Using the above two streets as an example, Abbey Ln and Abby Pl may be associated with the route (e.g., either by being streets along the route or that cross the route). However, Abbey Ln may be separated from Abby Pl such that the user will not come across Abbey Ln and Abby Pl in a situation that will cause confusion between the two with respect to which street to take along the route. In which case, the determinations of the abbreviations of Abbey Ln and Abby Pl need not consider both and still be able to have the user differentiate between the two.

In an embodiment, the distinction may be based on a route segment that is defined as being a segment of the route that is between two navigation guidance instructions. For example, the user may be instructed to turn left onto Blanchard St, which corresponds to a first navigation guidance instruction. The second (e.g., next) navigation guidance instruction may be based on the user needing to turn right onto Abbey Ln to continue following the route. Between the first navigation guidance instruction and the second navigation guidance instructions, Abbey Ln may be the only street that begins with the letter A. Thus, although Abby Pl may also form part of the route or be a cross street along the route, Abby Pl may not be along the route and does not cross the route between the first navigation guidance instruction and the second navigation guidance instruction. Even if a representation of Abby Pl is presented at the user interface, the second navigation guidance instruction may still be based on the abbreviation A because of the route segment defined by the first navigation guidance instruction and the second navigation instructions.

Although the examples discussed above for presenting navigation information are primarily based on geographical terms, the terms may include any term that is within the navigation information, such as terms that are primarily used for providing navigation guidance instructions. Terms such as Left, Straight, Right, North, South, East, West, and the like may be used to provide navigation guidance instructions. These terms may be abbreviated based on the above discussion. For example, where a street name that is presented at a user interface is Ridgewood, if the street name and the guidance instruction of Right are abbreviated, the abbreviations may be Rid and Rig, respectfully, where the abbreviation is based on all terms that are presented at a user interface. However, the further distinction (e.g., level of specificity/granularity) may be made based on what terms are used to provide directional information in navigation guidance instructions and what terms are used to provide geographical information in navigation guidance instructions. Because the term Right is used to provide directional information and the term Ridgewood is used to provide geographical information, the abbreviations may be determined based on this additional distinction. Thus, the abbreviations for both may be R if there are no other directional terms that begin with R and if there are no other geographical terms that begin with R. Thus, the resulting navigation guidance instruction would be Turn R at R. Distinctions may be made based on any difference in the terms that convey navigation information, such as distinctions between street names, city names, district names, landmark names, points-of-interest names, etc.

By way of example, the UE 101, the abbreviation platform 103, the services platform 107 and the content providers 113 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 2:
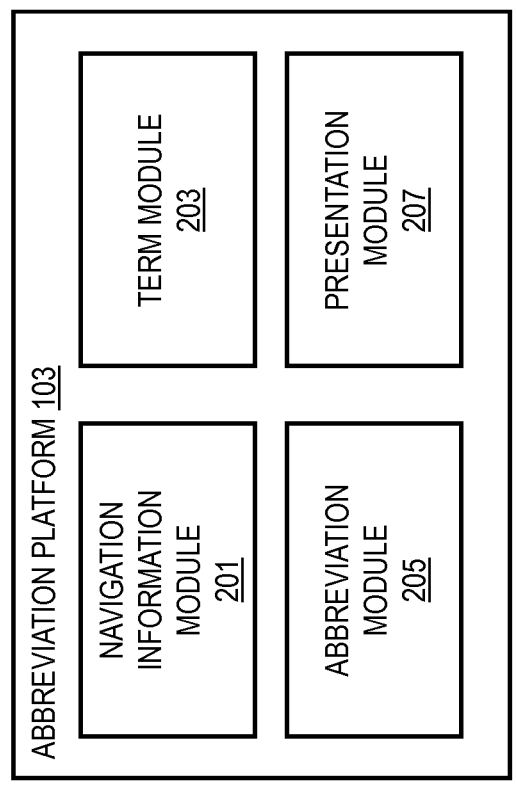
FIG. 2 is a diagram of the components of an abbreviation platform, according to an embodiment.

FIG. 2 is a diagram of the components of an abbreviation platform 103, according to an embodiment. By way of example, the abbreviation platform 103 includes one or more components for presenting one or more representations of one or more abbreviations of one or more terms for conveying navigation information. It is contemplated that the functions of these components may be combined in one or more components or performed by other components of equivalent functionality. For example, in an embodiment, the functions of these components may be performed entirely by the navigation application 111, or one or more other applications running at the UE 101. Further, in an embodiment, the functions of these components may be performed entirely by one or more services 109 at the services platform 107. In this embodiment, the abbreviation platform 103 includes a navigation information module 201, a term module 203, an abbreviation module 205 and a presentation module 207.

The navigation information module 201 interfaces with the software and/or hardware that determines and/or provides the navigation information in order for the navigation information module 201 to obtain the navigation information. Where a navigation application 111 provides the navigation information, the navigation information module 201 may interface with the navigation application 111 to obtain the navigation information. The navigation information may comprise any information and/or data that is associated with providing a user information regarding, for example, their current location, information regarding their surrounding location, a route for providing navigation guidance, the navigation guidance instructions associated with the route, and the like. The navigation information may include one or more terms that are used to convey the navigation information to a user. The one or more terms may include, for example, one or more street names, one or more landmark names, one or more points-of-interest names (e.g., names of restaurants, stores, malls, shopping districts, etc.), one or more names for geographical areas (e.g., neighborhoods, districts, cities, counties, countries, etc.). The navigation information module 201 also receives navigation guidance instructions that are used to provide instructions to the user for following a certain route between two locations.

The term module 203 determines from the navigation information collected by the navigation information module 201 the one or more terms that are used to convey navigation information to a user. The one or more terms may be used to convey the navigation information visually at a user interface or may be used to convey the navigation information audibly. By way of example, the one or more terms may be street names that are associated with a geographical area surrounding a current location of a user and/or associated with a route that a user is currently navigating. The abbreviation platform 103 determines the street names from the navigation information determined by the navigation information module 201. The terms may also constitute part of the navigation guidance instructions, such as the terms Turn, Right, Left, Continue, Follow, etc. The term module 203 may further determine these terms from the navigation information.

The abbreviation module 205 determines the abbreviations of the terms conveying the navigation information. The abbreviation for a term may be based on, for example, one or more of the other terms that are represented within a user interface, one or more other terms that are represented within a user interface and corresponding with a route within the navigation information and/or one or more other terms that are associated with a route segment of a route within the navigation information. However, the abbreviations may be based on various other distinctions that may be made and that are contained within the navigation information. Thus, the abbreviation module 205 may determine an abbreviation of a term based on all of the terms that are represented within a user interface such that all of the representations of the terms that are presented at a user interface can be differentiated from each other based on their abbreviations. In such an embodiment, all of the abbreviations may be unique.

The abbreviation module 205 may also, or in the alternative, determine an abbreviation of a term so that the abbreviation is unambiguous with respect to other terms associated with a route that is represented at the user interface. In this situation, the distinction of being associated with a route and not being associated with a route may contribute to how a term is abbreviated. The other terms that are used for determining an abbreviation of a term may be limited to the terms that are associated with the route. For example, only the terms associated with a route may be used to determine an abbreviation of a term that is also associated with a route because the distinction of the route may preclude any confusion of the user based on an abbreviation. Although two terms may have the same abbreviation, one term may be associated with the route and the other term may not be associated with the route, which further serves to differentiate the two terms and their abbreviations. Further, although two terms may potentially be associated with the same abbreviation according to the above, only one of the terms may be represented within the user interface, such as the term that is associated with the route.

The abbreviation module 205 may also, or in the alternative, determine an abbreviation of a term so that the abbreviation is unambiguous with respect to other terms associated with a segment of a route that is represented at the user interface. In this situation, the distinction of being associated with the route, and particularly with the segment of the route, may contribute to how a term is abbreviated. The other terms that are used for determining an abbreviation of a term may be limited to the terms that are associated with the route segment. For example, only the terms associated with a route segment may be used to determine an abbreviation of a term that is also associated with the route segment because the distinction of the route segment may preclude any confusion of the user based on an abbreviation. Although two terms may have the same abbreviation, one term may be associated with the route segment and the other term may not be associated with the route segment, which further serves to differentiate the two terms and their abbreviations.

In an embodiment, the abbreviation module 205 determines the one or more letters of a term that are the fewest number of possible starting letters of the term to determine the abbreviation. Thus, for the terms Main and Second, the fewest number of possible starting letters is one because M is different than S. For the two terms Foundry and Founders, the fewest number of possible starting letters is six because Foundr is different than Founde. In determining the fewest possible number of starting letters, as discussed above, the abbreviation module 205 can use other distinctions, such as whether terms are associated with the route and/or route segment, to determine a fewest number of possible starting letters. For example, if Foundry is associated with a route and Founders is not, the fewest number of starting letters for Foundry may be one if no other term starts with the letter F and is associated with the route. Further, if Foundry and Founders are both associated with a route, but only Foundry is associated with a particular route segment, the fewest number of starting letters may again be one if no other term starts with the letter F and is associated with the route segment.

The presentation module 207 determines the representations of the abbreviations and how to present the representations at, for example, a UE 101. The representation may be presented visually and/or audibly. For visual representations, the representations of the abbreviations may be associated with representations of other navigation information, such as representations of the surrounding geographical region, including representations of the streets. For example, the abbreviations may be presented as labels of the streets. The representations of the abbreviations may also constitute part of, or the entirety of, navigation guidance instructions. Thus, as representations of navigation guidance instructions are presented at a user interface, the representations may include one or more representations of the abbreviations. For example, where a navigation application 111 determines to convey the navigation guidance instruction of Turn right at Abbots Stone Way, the representation presented at the user interface that includes abbreviations may be Turn right at Abbo based on the abbreviation of the term Abbo. As discussed above, the term right may also constitute a term for conveying navigation information. Thus, an abbreviation for the term right may also be determined and a representation of the abbreviation may be presented within the representation of the navigation guidance instruction, such as Turn R at Abbo.

Figure 3:
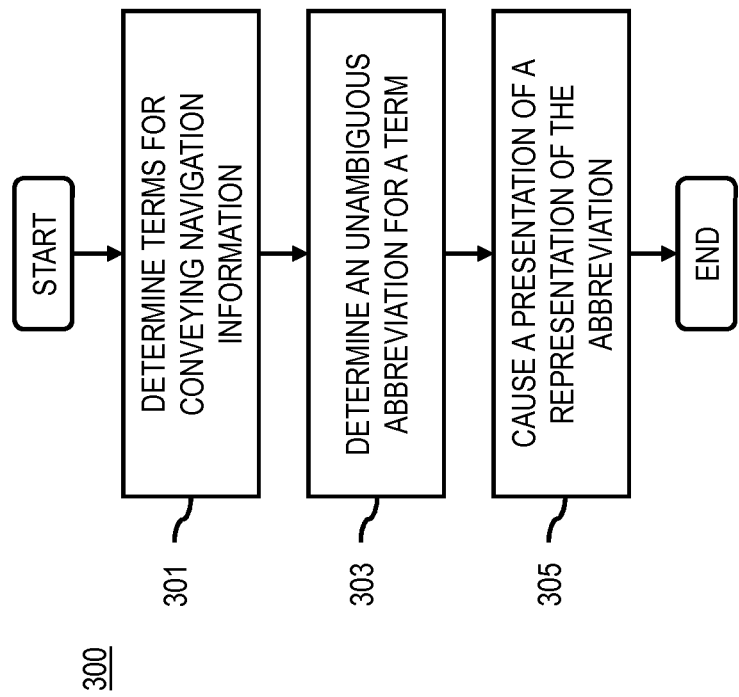
FIG. 3 is a block diagram of operations for presenting one or more representations of one or more abbreviations of one or more terms for conveying navigation information, according to at least one example embodiment of the present invention.

FIG. 3 is a block diagram of operations for presenting one or more representations of one or more abbreviations of one or more terms for conveying navigation information, according to at least one example embodiment of the present invention. In at least one example embodiment, the apparatus 700 and/or its components (e.g., processor 702, display 714) of FIG. 7 perform and/or provide means for performing any of the operations described in the process 300 of FIG. 3.

As shown in operation 301, the abbreviation platform 103 may perform and be configured with means (e.g., processor 702) to determine one or more terms for conveying navigation information. The one or more terms may comprise one or more street names forming a navigation route, one or more cross street names along the navigation route, one or more landmark names along the navigation route, one or more points-of-interest names along the navigation route, or a combination thereof. The one or more terms may also be terms used for providing navigation guidance instructions, such as terms used for providing directional information (e.g., North, South, East, West, Left, Right, Straight, etc.). The one or more terms may also be terms associated with navigation information that are presented at a user interface without being associated with a particular route, such as merely labels of representations of streets and other geographical features. Thus, the terms may be any term that conveys the navigation information either visually (e.g., at a user interface) and/or audibly.

As shown in operation 303, the abbreviation platform 103 may perform and be configured with means (e.g., processor 702) to determine at least one abbreviation for at least one term of the one or more terms so that the at least one abbreviation is unambiguous with respect to other one or more of the one or more terms. The abbreviation platform 103 takes into consideration one or more other terms when considering an abbreviation for a term. The one or more other terms may be segmented into various groups, and the consideration may be based on only one or more of the groups. For example, in an embodiment, the one or more other terms may be the group of terms whose representations are presented at a user interface during the same time that the representation of the term that is being abbreviated is presented at a user interface. Further, in an embodiment, the one or more other terms may be the group of terms that are associated with a route that the term that is being abbreviated is also associated with. Further, in an embodiment, the one or more other terms may be the group of terms that are associated with a route segment that the term that is abbreviated is also associated with. Other terms that are not associated with the route segment may be disregarded for purposes of determining the abbreviation of the term. The term that is being abbreviated may be a term used to provide directional information within a navigation guidance instruction, such as the terms North, South, East, West, Left, Right, Straight, etc. The one or more other terms that are considered in determining an abbreviation for the term being abbreviated may be the one or more directional conveying terms whose representations are also presented at the user interface.

As shown in operation 305, the abbreviation platform 103 may perform and be configured with means (e.g., processor 702) to cause a presentation of at least one representation of the at least one abbreviation. The presentation of the at least one representation may be a visual representation associated with a user interface, such as by labeling on a map the name of a street represented at the user interface. The presentation may also be a visual presentation of a representation of a navigation guidance instruction. Where the presentation is a visual representation at the user interface, the abbreviation may allow the labeling of a street name without having to reduce the font of the street name and/or without having to wrap the street name (e.g., line break) within the user interface. The presentation of the representation may be an audio representation, such as an audio navigation guidance instruction. In this case, the abbreviation may allow for a shorter audio clip that allows a user to hear the least amount of information to comprehend the subject of the navigation guidance instruction in a shorter amount of time. For example, Turn right at R rather than Turn right at Robert F. Kennedy Memorial Highway. Thus, the abbreviation platform 103 allows for abbreviations of terms for conveying navigation information to provide such navigation information despite limitations in or associated with user interfaces (e.g., display size, display resolution) and/or in providing audio clips regarding the navigation information.

Figure 4:
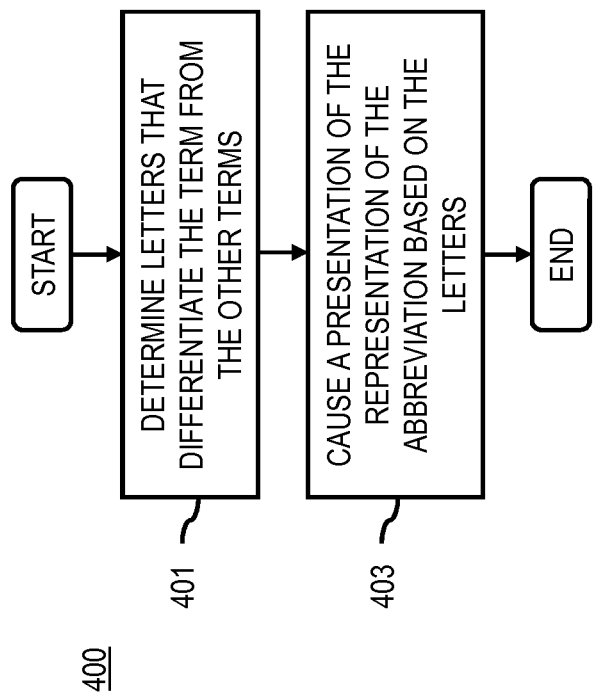
FIG. 4 is a block diagram of operations for determining one or more letters of an abbreviation, according to at least one example embodiment of the present invention.

FIG. 4 is a block diagram of operations for determining one or more letters of an abbreviation, according to at least one example embodiment of the present invention. In at least one example embodiment, the apparatus 700 and/or its components (e.g., processor 702, display 714) of FIG. 7 perform and/or provide means for performing any of the operations described in the process 400 of FIG. 4.

As shown in operation 401, the abbreviation platform 103 may perform and be configured with means (e.g., processor 702) to determine one or more letters associated with the at least one term that differentiates the at least one term from one or more terms for conveying navigation information. The one or more letters may be the fewest number of starting letters of the at least one term that differentiates the at least one term from the one or more terms. Further, the differentiation may be based on all of the terms that convey navigation information, such as the terms that are associated with current representations at a user interface. The differentiation may alternatively be based on all of the terms associated with a route within the navigation information. The differentiation may alternatively be based on all of the terms associated with a route segment of a route within the navigation information.

Thus, the fewest number of starting letters may be different depending on the basis of the differentiation.

By way of example, for the street names Abbots Stone Way, Abbey Pl, Audrey Ln, and Chain Bridge Rd associated with a representation of navigation information at a user interface, considering all of the terms, the abbreviation for Abbots Stone Way may be Abbo. In this situation, Abbo represents the fewest number of starting letters considering all of the street names, particularly considering Abbey Pl. However, if only Abbots Stone Way, Audrey Ln, and Chain Bridge Rd are associated with a route that is within the navigation information that is represented at the user interface, the abbreviation for Abbots Stone Way may be Ab, which is the fewest number of starting letters considering the street names associated with the route. In this case, the abbreviation platform 103 considers that there will be no confusion between Ab representing Abbots Stone Way or Abbey Pl because Abbey Pl is not associated with the route. Further, if only Abbots Stone Way and Chain Bridge Rd are associated with a route segment, the abbreviation for Abbots Stone Way may be A, which is the fewest number of starting letters. Here, the abbreviation platform 103 further considers that there will be no confusion between A representing Abbots Stone Way and either of Abbey Pl or Audrey Ln because the later two streets are not associated with the route segment.

Whether the abbreviation platform 103 considers all of the terms for conveying navigation information that may have representations presented at a user interface for determining the abbreviation, or a subset of the terms, may be determined based on, for example, one or more user preferences, whether there is an active route associated with the navigation information, the size of the display associated with the user interface, or a combination thereof. For example, a user may set a preference to have the abbreviations set as specific as possible, and thus consider all terms for conveying navigation information that may have concurrent representations presented. Alternatively, the user may feel fairly comfortable with the surrounding environment, and would prefer shorter abbreviations that are based on only the terms associated with a route segment. Additionally, a UE 101 may have a small display for which to present the representations of the navigation information. In which case, the abbreviation platform 103 may determine to create the abbreviations as short as possible and therefore consider only terms that are grouped together, such as based on route segments, for determining the abbreviations. As shown in operation 403, the abbreviation platform 103 may perform and be configured with means (e.g., processor 702) to cause a presentation of at least one representation of the at least one abbreviation, as described above with respect to operation 305 in FIG. 3.

Figure 5:
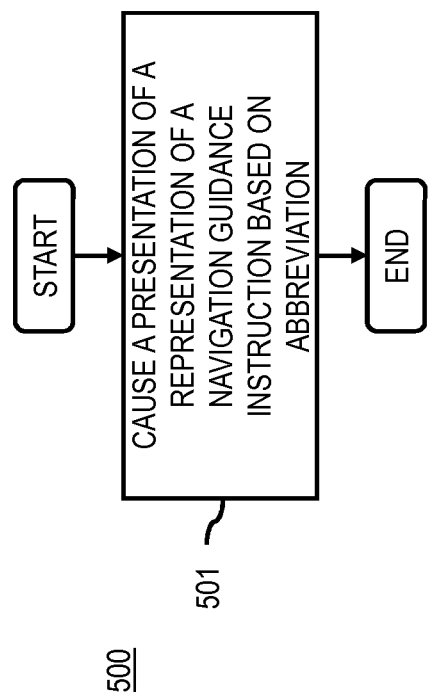
FIG. 5 is a block diagram of operations for presenting at least one representation of at least one navigation guidance instruction, according to at least one example embodiment of the present invention.

FIG. 5 is a block diagram of an operation for presenting at least one representation of at least one navigation guidance instruction, according to at least one example embodiment of the present invention. In at least one example embodiment, the apparatus 700 and/or its components (e.g., processor 702, display 714) of FIG. 7 perform and/or provide means for performing the operation described in the process 500 of FIG. 5.

As shown in operation 501, the abbreviation platform 103 may perform and be configured with means (e.g., processor 702) to cause a presentation of at least one representation of at least one navigation guidance instruction comprising at least one abbreviation of a term for conveying navigation information. The abbreviation platform 103 may receive the navigation guidance instruction from the software and/or hardware that is providing and/or determining the navigation information (e.g., navigation application 111). Upon receiving the navigation guidance instruction, the abbreviation platform 103 may parse the terms within the navigation guidance instruction to determine any abbreviations of the terms. As discussed above, terms that convey directional information, such as Right, Left, Straight, North, South, East, West, and the like may be abbreviated. Further, points-of-interest and/or landmark names may be included in the navigation guidance instruction and may be abbreviated. Thus, where the received navigation guidance instruction is Turn right at Lincoln Memorial, the navigation guidance instruction may be abbreviated to Turn R at Lincoln. A representation of the abbreviated navigation guidance instruction may then be presented at the UE 101. The representation may be presented visually at the user interface, such as by having a textual representation of the navigation guidance instruction appear at the user interface. The presentation may be presented audibly, such as by having one or more text-to-speech engines read text representing the navigation guidance instruction including the abbreviations. Accordingly, a user may be presented with one or more representations of navigation guidance instructions that are abbreviated to aid the user in quickly and easily understanding the instructions. Under this approach, the user can more closely focus on a primary task, such as driving a car, and not need to closely read or listen to a presentation of representations of navigation guidance instructions.

Figure 6B:
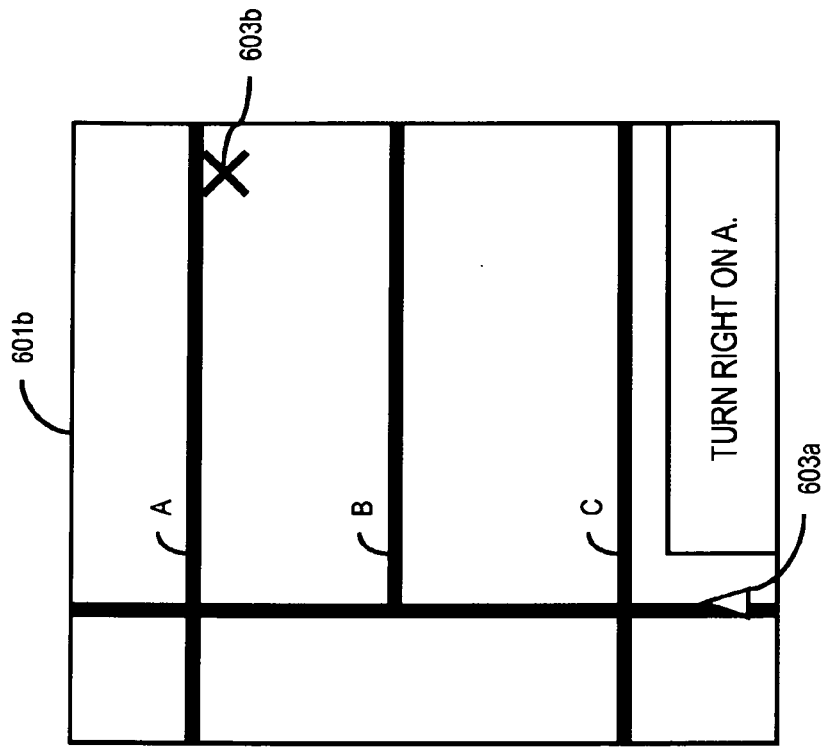
FIGS. 6A-6J are diagrams of user interfaces utilized in the processes of FIGS. 3-5, according to various embodiments.
Figure 6A:
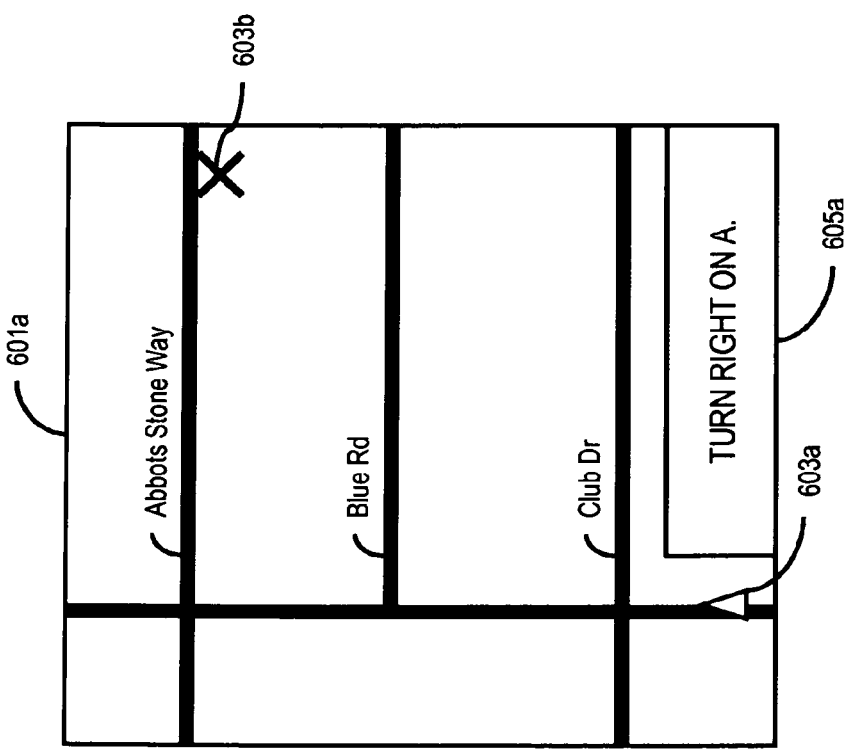

FIGS. 6A-6J are diagrams of user interfaces utilized in the processes of FIGS. 3-5, according to various embodiments. As illustrated in FIG. 6A, a user interface 601a of a UE 101 may present a representation of navigation information that includes representations of four streets (including those labeled Club Dr, Blue Rd, and Abbots Stone Way). The user interface 601a may also present representations of, for example, the current position 603a of the UE 101 and a destination 603b of the UE 101, such as in the case where the UE 101 is currently being used to provide representations of navigation information with respect to traveling between two geographical points. However, in an embodiment, the user interface 601a may not include representations of the current position 603a and the destination 603b. As illustrated, the navigation information may include representations of the streets Club Dr, Blue Rd, and Abbots Stone Way. Under the scenario illustrated in FIG. 6A, the representations of the street names may not need to be shortened to fit on the user interface 601a (e.g., such as based on the size of the display). Thus, the full names of the streets may be presented in the representations of the street names. However, according to the route (e.g., between the current position 603a and the destination 603b), the user needs to turn right at Abbots Stone Way. To visualize on the user interface 601a the next action that needs to be taken to follow the route, the user interface 601a may present a representation 605a of a navigation guidance instruction. Further, for ease of, for example, understanding the next action, the representation 605a of the navigation guidance instruction may include an abbreviated term used for conveying navigation information. In the illustrated example, the representation of the abbreviated term is A, which unambiguously refers to the street name Abbots Stone Way. The representation is A because, for example, out of the three representations of the street names, only one starts with the letter A. Thus, A unambiguously refers to Abbots Stone Way. By presenting the representation 605a of the navigation guidance instruction that includes the representation of the abbreviation A, the user can clearly see that a right turn is required at the next road to begin with the letter A.

In an embodiment illustrated in FIG. 6B, representations of the abbreviations of the street names may be presented within the user interface 601b regardless of whether the abbreviations are needed. Here, the abbreviations may include only the first letter of all three streets because the first letter distinguishes the streets from each other. However, user interface 601b may represent a user interface where the user interface is limited and otherwise cannot display the full street names in the representations. Thus, the representations of the street names may be abbreviated.

Figure 6D:
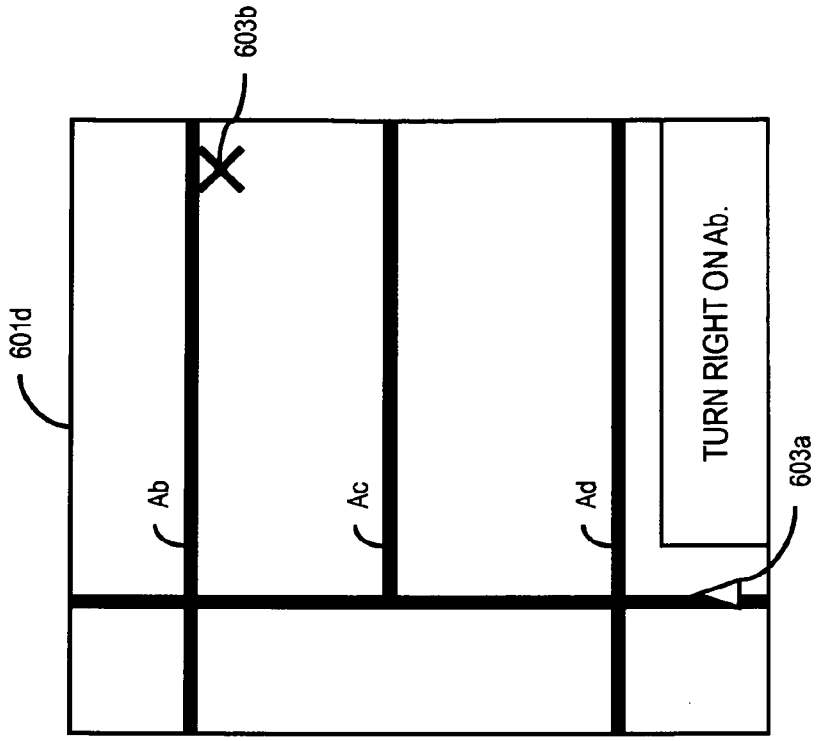
Figure 6C:
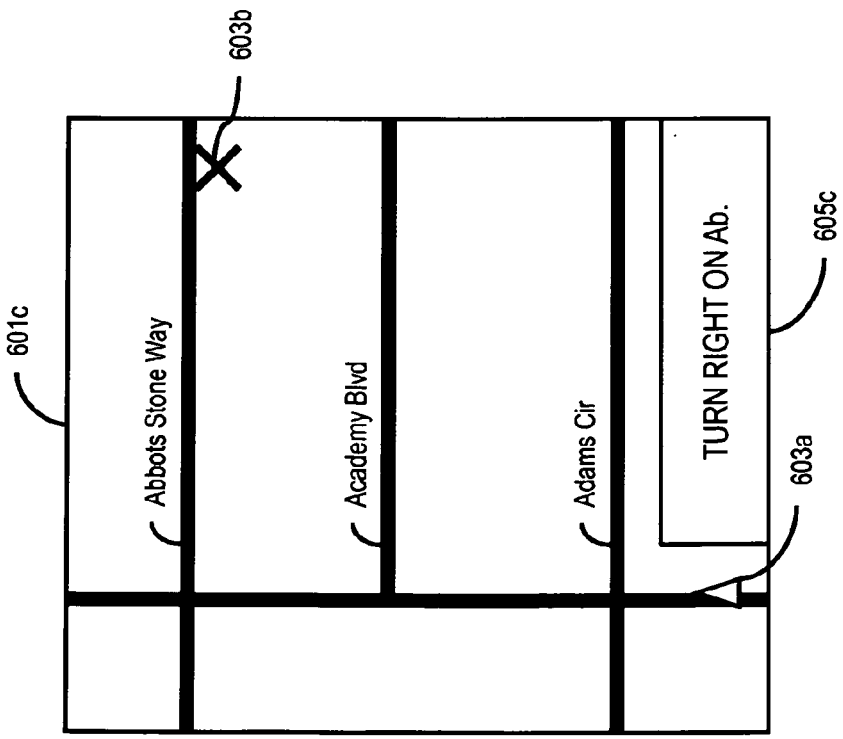

FIG. 6C illustrates a user interface 601c of a UE 101 presenting a representation of navigation information that includes representations of four streets (including those labeled Adams Cir, Academy Blvd, and Abbots Stone Way). The user interface 601c may also present representations of, for example, the current position 603a of the UE 101 and a destination 603b of the UE 101, such as in the case where the UE 101 is currently being used to provide navigation information with respect to traveling between two geographical points. As illustrated, the navigation information may include representations of the streets Adams Cir, Academy Blvd, and Abbots Stone Way. As discussed above, under the scenario illustrated in FIG. 6A, the representations of the street names may not need to be shortened to fit on the user interface 601c (e.g., such as based on the size of the screen). Thus, the full names of the streets may be presented in the representations of the street names. However, according to the route (e.g., between the current position 603a and the destination 603b), the user needs to turn right at Abbots Stone Way. To visualize on the user interface 601c the next action that needs to be taken to follow the route, the user interface 601c may present a representation 605c of a navigation guidance instruction. Further, for ease of, for example, understanding the next action, the representation 605c of the navigation guidance instruction may include an abbreviated term used for conveying navigation information. In the illustrated example, the representation of the abbreviated term is Ab, which unambiguously refers to the street name Abbots Stone Way. The representation is Ab because, for example, out of the three presentations of the representations of the street names, only one starts with the letters Ab. Thus, Ab unambiguously refers to Abbots Stone Way. By presenting the representation 605c of the navigation guidance instruction that includes the representation of the abbreviation Ab, the user can clearly see that a right turn is required at the next road to begin with the letters Ab.

In an embodiment illustrated in FIG. 6D, representations of the abbreviations of the street names may be presented within the user interface 601d regardless of whether the abbreviations are needed. Here, the abbreviations may include only the first two letters of all three streets because the first two letters distinguish the streets from each other. However, user interface 601d may represent a user interface where the user interface is limited and otherwise cannot display the full street names in the representations. Thus, the representations of the street names may be abbreviated.

The embodiments illustrated in the above examples of the user interfaces 601a-601d may further abbreviate the streets names including as many letters of the streets names required to differentiate the street names from other street names. For example, FIG. 6E illustrates a user interface 601e of a UE 101 presenting a representation of navigation information that includes representations of four streets (including those labeled Abbot Ln, Abbey Pond Ln, and Abbots Stone Way). The user interface 601e may also present representations of, for example, the current position 603a of the UE 101 and a destination 603b of the UE 101, such as in the case where the UE 101 is currently being used to provide navigation information with respect to traveling between two geographical points. As discussed above, under the scenario illustrated in FIGS. 6A and 6C, the representations of the street names may not need to be shortened to fit on the user interface 601 (e.g., such as based on the size of the screen). Thus, the full names of the streets may be presented in the representations of the street names. However, to visualize on the user interface 601e the next action that needs to be taken to follow the route, the user interface 601e may present a representation 605e of a navigation guidance instruction. Further, for ease of, for example, understanding the next action, the representation 605e of the navigation guidance instruction may include an abbreviated term used for conveying navigation information. In the illustrated example, the representation of the abbreviated term is Abbots, which unambiguously refers to the street name Abbots Stone Way. The representation is Abbots because, for example, out of the three presentations of the representations of the street names, only one starts with the six characters Abbots (where, in an embodiment, a space is considered a character). Thus, Abbots unambiguously refers to Abbots Stone Way. By presenting the representation 605e of the navigation guidance instruction that includes the representation of the abbreviation Abbots, the user can clearly see that a right turn is required at the next road to begin with the letters Abbots.

Figure 6F:
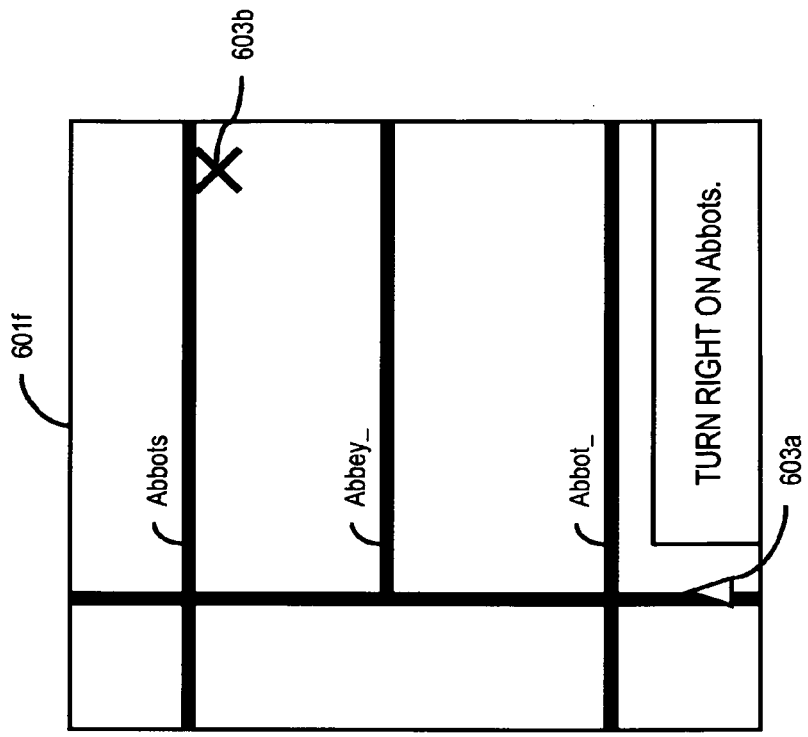
Figure 6E:
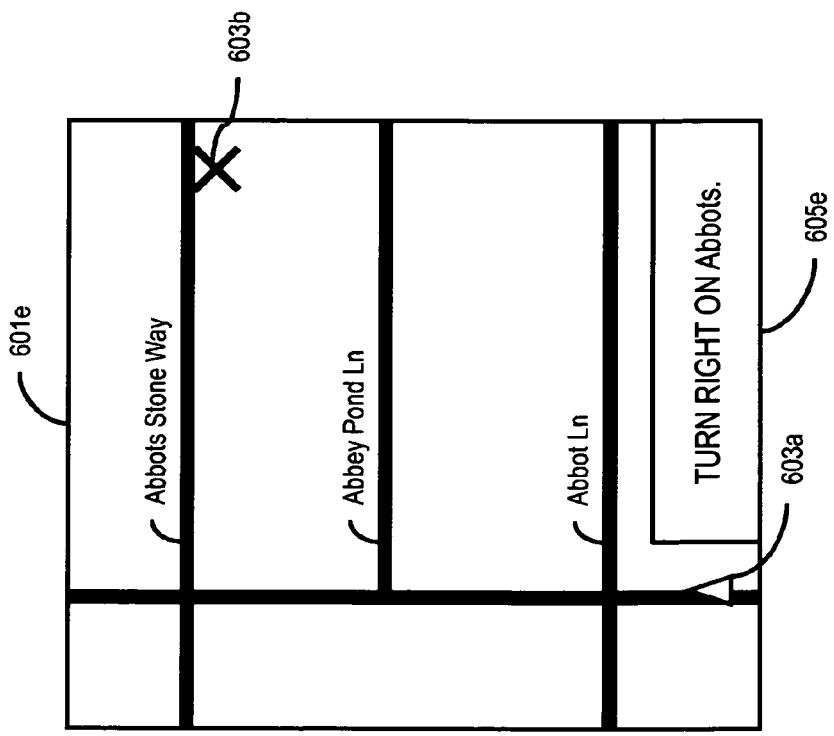

In an embodiment illustrated in FIG. 6F, representations of the abbreviations of the street names may be presented within the user interface 601f regardless of whether the abbreviations are needed. Here, the abbreviations may include the first six characters of all three streets because the first six characters distinguish the streets from each other. Further, in the case of the first two representations of the street names, an underscore, for example, may be included in the representation to correspond with spaces in the street names. However, any other character may represent a space with a term conveying navigation information, such as a character that is more visible. Further, with respect to the street name Abbey Pond Ln, although the first four letters differentiate Abbey Pond Ln from the other two street names, in an embodiment, the abbreviation platform 103 may maintain the same number of letters for all of the representations of the terms (e.g., six letters in FIG. 6F).

Figure 6H:
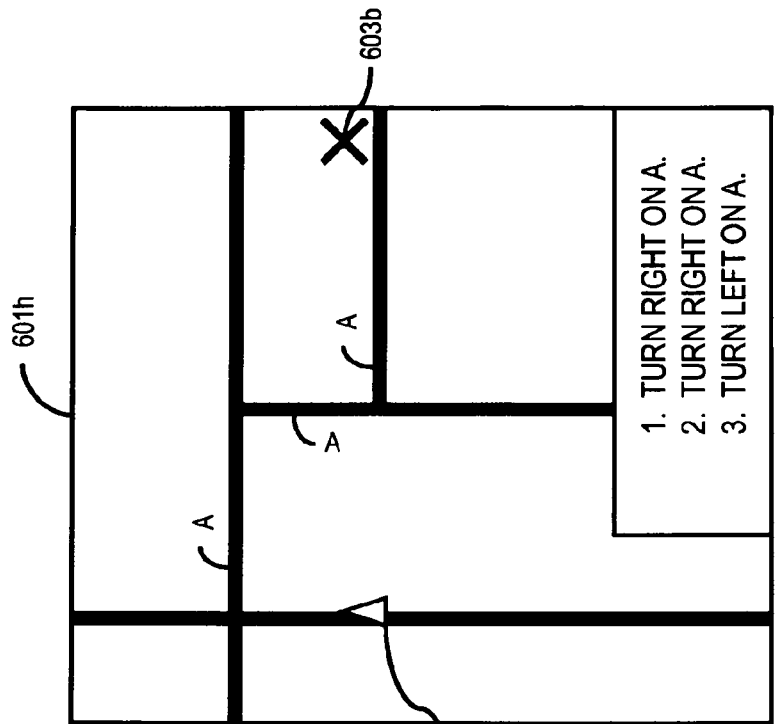
Figure 6G:
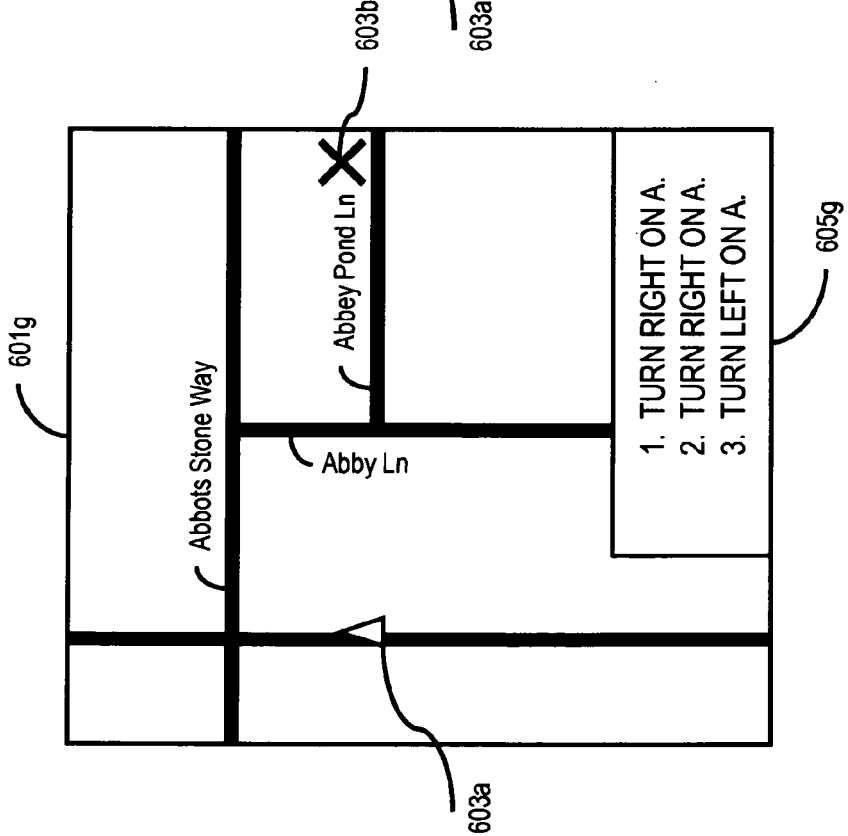

FIG. 6G illustrates a user interface 601g of a UE 101 presenting a representation of navigation information that includes representations of four streets (including those labeled Abbots Stone Way, Abby Ln, and Abbey Pond Ln). The user interface 601g may also present representations of, for example, the current position 603a of the UE 101 and a destination 603b of the UE 101. To visualize on the user interface 601g the next action that needs to be taken to follow the route, the user interface 601g may present a representation 605g of a navigation guidance instruction. Further, for ease of, for example, understanding the next action, the representation 605g of the navigation guidance instruction may include abbreviations of the terms used for conveying navigation information. In the illustrated example, the representations of the abbreviations are all A. Despite all of the street names beginning with the same letter, FIG. 6G illustrates the example where the abbreviations are determined based on the terms used for conveying navigation information grouped by route segments. For example, as illustrated, to follow the route the user must turn right at Abbots Stone Way and right at Abby Ln. Although both streets begin with the letter A, because there are no other options for turning right off of Abbots Stone Way, the abbreviation may be A for Abby Ln without concern for the user to misunderstanding the correct road to turn right onto. The same is true for turning left onto Abbey Pond Ln. Because Abbey Pond Ln is the first road where turning left is available, the abbreviation may be A without concern for the user being able to correctly determine the road to turn left onto to follow the route. In other words, after each turn, the user will not encounter another road with the same beginning letter. Thus, without any additional consideration, the abbreviation of A may not unambiguously distinguish the three street names from each other; however, the context of the user following the route provides the additional consideration.

In an embodiment illustrated in FIG. 6H, representations of the abbreviations of the street names may be presented within the user interface 601h regardless of whether the abbreviations are needed. Here, the abbreviations may include only the first letter of the three streets because the first letters distinguish the streets from each other within the context of the user following the path between the current position 603a and the destination 603b.

Figure 6J:
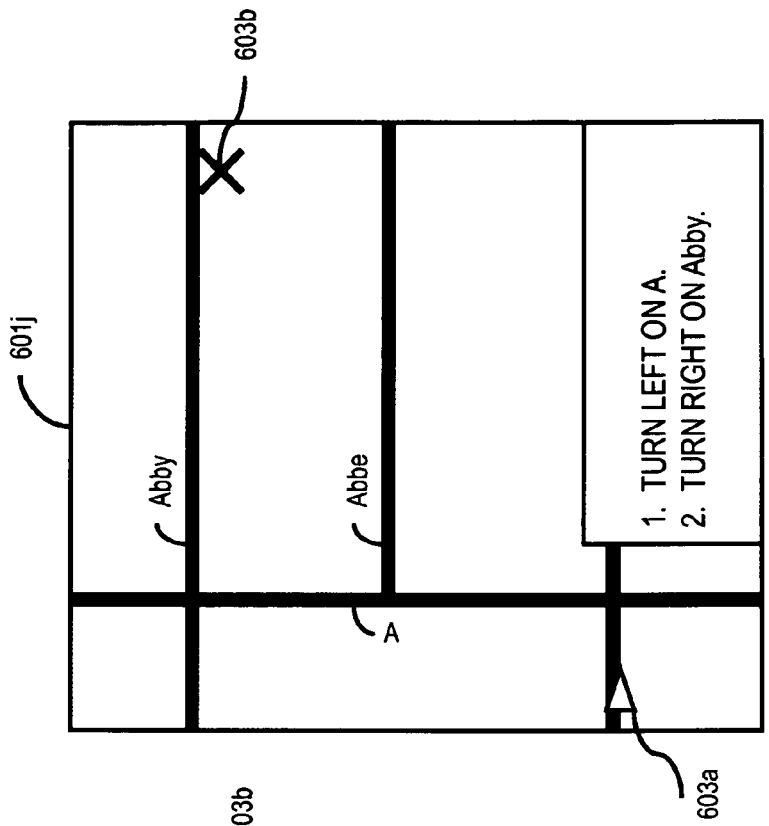
Figure 6I:
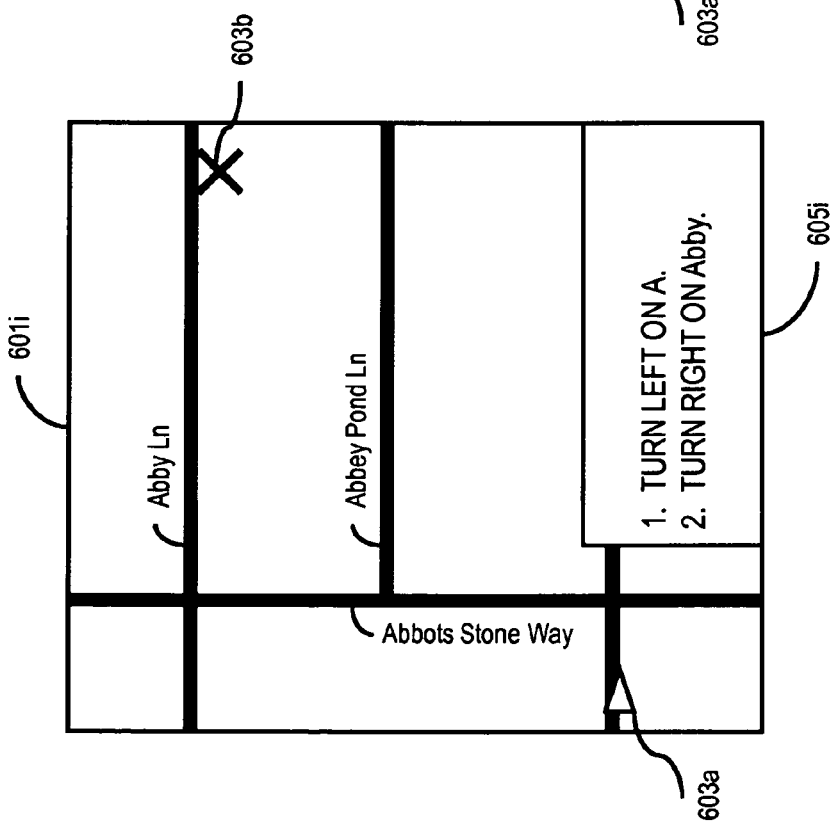

FIG. 6I illustrates a user interface 601i of a UE 101 presenting a representation of navigation information that includes representations of four streets (including those labeled Abbots Stone Way, Abbey Pond Ln, and Abby Ln). The user interface 601i may also present representations of, for example, the current position 603a of the UE 101 and a destination 603b of the UE 101 to represent a navigation route. To visualize on the user interface 601i the next action that needs to be taken to follow the route, the user interface 601i may present a representation 605i of a navigation guidance instruction. Further, for ease of, for example, understanding the next action, the representation 605i of the navigation guidance instruction may include abbreviations of the terms used for conveying navigation information. In the illustrated example, the representations of the abbreviations include the abbreviations A and Abby. Without the context of the route between the current position 603a and the destination 603b, using the abbreviation A for Abbots Stone Way does not differentiate the street name from the other street names. However, within the context of the route formed from the current position 603a to the left turn onto Abbots Stone Way along the route, Abbots Stone Way represents the only option to turn left, or at least the first option. Thus, the abbreviation A differentiates Abbots Stone Way from any other road along the route for the particular segment (which is none in this case).

After turning left onto A (Abbots Stone Way), the user is presented with two right turn possibilities, each corresponding to street names beginning with the letter A. Thus, A does not differentiate Abbey Pond Ln from Abby Ln. Rather, the abbreviation Abby differentiates the street name Abby Ln from (corresponding to the second right turn) from the street name Abbey Pond Ln (corresponding to the first right turn). Accordingly, the navigation guidance instruction for the second action along the route for turning right onto Abby Ln may be presented based on a representation of the abbreviation Abby.

In an embodiment illustrated in FIG. 6J, representations of the abbreviations of the street names may be presented within the user interface 601j regardless of whether the abbreviations are needed. Here, the abbreviations may include the first letter for the street name Abbots Stone Way and the first four letters for the street names Abby Ln and Abbey Pond Ln, for the reasons presented above.

The processes described herein for presenting one or more representations of one or more abbreviations of one or more terms for conveying navigation information may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 7:
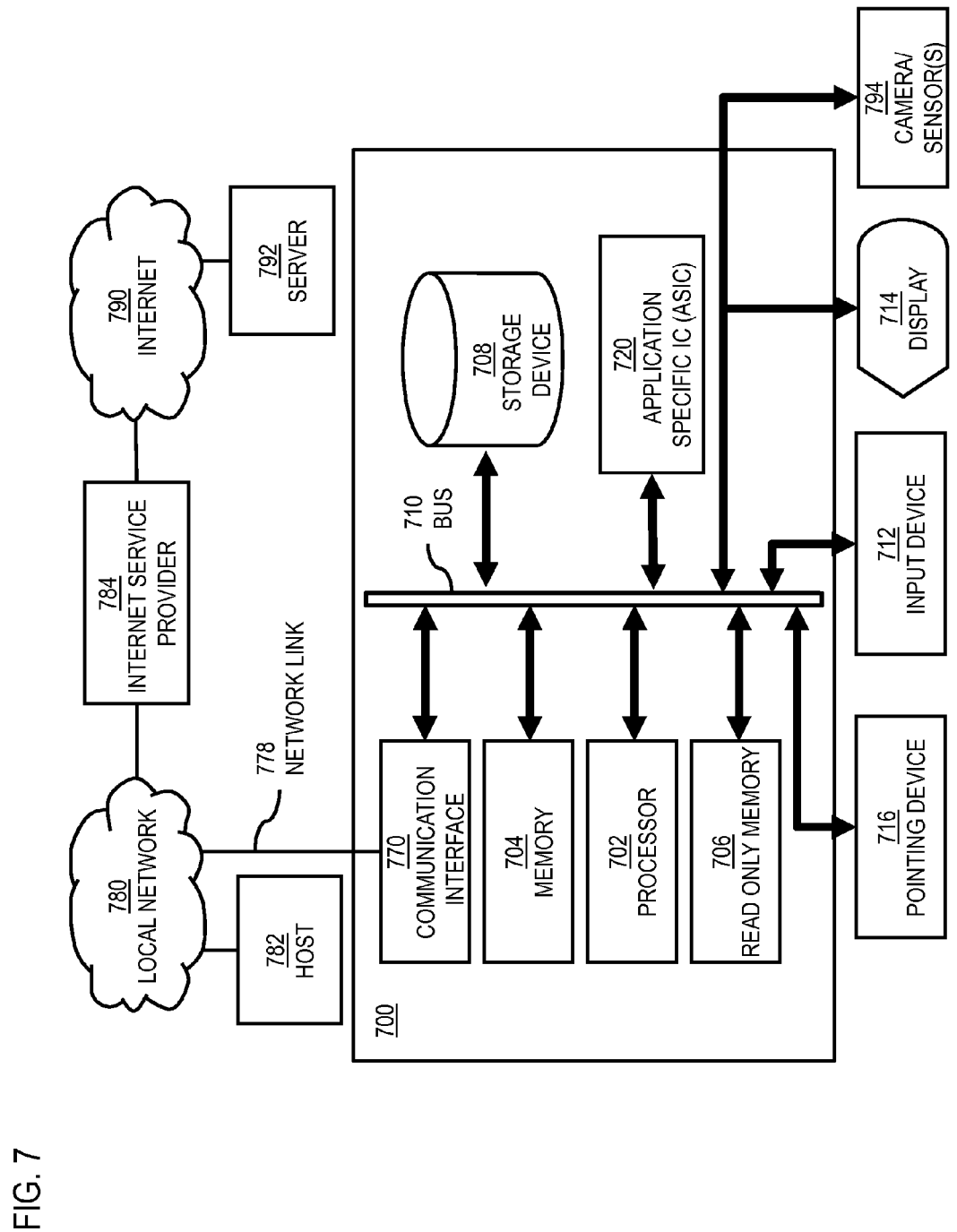
FIG. 7 is a diagram of hardware that can be used to implement at least one example embodiment of the present invention.

FIG. 7 illustrates a computer system 700 upon which an embodiment of the invention may be implemented. Although computer system 700 is depicted with respect to a particular device or equipment, it is contemplated that other devices or equipment (e.g., network elements, servers, etc.) within FIG. 7 can deploy the illustrated hardware and components of system 700. Computer system 700 is programmed (e.g., via computer program code or instructions) to present one or more representations of one or more abbreviations of one or more terms for conveying navigation information as described herein and includes a communication mechanism such as a bus 710 for passing information between other internal and external components of the computer system 700. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 700, or a portion thereof, constitutes a means for performing one or more steps of presenting one or more representations of one or more abbreviations of one or more terms for conveying navigation information.

A bus 710 includes one or more parallel conductors of information so that information is transferred quickly among devices coupled to the bus 710. One or more processors 702 for processing information are coupled with the bus 710.

A processor (or multiple processors) 702 performs a set of operations on information as specified by computer program code related to presenting one or more representations of one or more abbreviations of one or more terms for conveying navigation information. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 710 and placing information on the bus 710. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 702, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 700 also includes a memory 704 coupled to bus 710. The memory 704, such as a random access memory (RAM) or any other dynamic storage device, stores information including processor instructions for presenting one or more representations of one or more abbreviations of one or more terms for conveying navigation information. Dynamic memory allows information stored therein to be changed by the computer system 700. RAM allows a unit of information stored at a location called a memory address to be stored and retrieved independently of information at neighboring addresses. The memory 704 is also used by the processor 702 to store temporary values during execution of processor instructions. The computer system 700 also includes a read only memory (ROM) 706 or any other static storage device coupled to the bus 710 for storing static information, including instructions, that is not changed by the computer system 700. Some memory is composed of volatile storage that loses the information stored thereon when power is lost. Also coupled to bus 710 is a non-volatile (persistent) storage device 708, such as a magnetic disk, optical disk or flash card, for storing information, including instructions, that persists even when the computer system 700 is turned off or otherwise loses power.

Information, including instructions for presenting one or more representations of one or more abbreviations of one or more terms for conveying navigation information, is provided to the bus 710 for use by the processor from an external input device 712, such as a keyboard containing alphanumeric keys operated by a human user, a microphone, an Infrared (IR) remote control, a joystick, a game pad, a stylus pen, a touch screen, or a sensor. A sensor detects conditions in its vicinity and transforms those detections into physical expression compatible with the measurable phenomenon used to represent information in computer system 700. Other external devices coupled to bus 710, used primarily for interacting with humans, include a display device 714, such as a cathode ray tube (CRT), a liquid crystal display (LCD), a light emitting diode (LED) display, an organic LED (OLED) display, a plasma screen, or a printer for presenting text or images, and a pointing device 716, such as a mouse, a trackball, cursor direction keys, or a motion sensor, for controlling a position of a small cursor image presented on the display 714 and issuing commands associated with graphical elements presented on the display 714. In some embodiments, for example, in embodiments in which the computer system 700 performs all functions automatically without human input, one or more of external input device 712, display device 714 and pointing device 716 is omitted.

In the illustrated embodiment, special purpose hardware, such as an application specific integrated circuit (ASIC) 720, is coupled to bus 710. The special purpose hardware is configured to perform operations not performed by processor 702 quickly enough for special purposes. Examples of ASICs include graphics accelerator cards for generating images for display 714, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 700 also includes one or more instances of a communications interface 770 coupled to bus 710. Communication interface 770 provides a one-way or two-way communication coupling to a variety of external devices that operate with their own processors, such as printers, scanners and external disks. In general the coupling is with a network link 778 that is connected to a local network 780 to which a variety of external devices with their own processors are connected. For example, communication interface 770 may be a parallel port or a serial port or a universal serial bus (USB) port on a personal computer. In some embodiments, communications interface 770 is an integrated services digital network (ISDN) card or a digital subscriber line (DSL) card or a telephone modem that provides an information communication connection to a corresponding type of telephone line. In some embodiments, a communication interface 770 is a cable modem that converts signals on bus 710 into signals for a communication connection over a coaxial cable or into optical signals for a communication connection over a fiber optic cable. As another example, communications interface 770 may be a local area network (LAN) card to provide a data communication connection to a compatible LAN, such as Ethernet. Wireless links may also be implemented. For wireless links, the communications interface 770 sends or receives or both sends and receives electrical, acoustic or electromagnetic signals, including infrared and optical signals, that carry information streams, such as digital data. For example, in wireless handheld devices, such as mobile telephones like cell phones, the communications interface 770 includes a radio band electromagnetic transmitter and receiver called a radio transceiver. In certain embodiments, the communications interface 770 enables connection to the communication network 105 for presenting one or more representations of one or more abbreviations of one or more terms for conveying navigation information at the UE 101.

The term "computer-readable medium" as used herein refers to any medium that participates in providing information to processor 702, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 708. Volatile media include, for example, dynamic memory 704. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 720.

Network link 778 typically provides information communication using transmission media through one or more networks to other devices that use or process the information. For example, network link 778 may provide a connection through local network 780 to a host computer 782 or to equipment 784 operated by an Internet Service Provider (ISP). ISP equipment 784 in turn provides data communication services through the public, world-wide packet-switching communication network of networks now commonly referred to as the Internet 790.

A computer called a server host 792 connected to the Internet hosts a process that provides a service in response to information received over the Internet. For example, server host 792 hosts a process that provides information representing video data for presentation at display 714. It is contemplated that the components of system 700 can be deployed in various configurations within other computer systems, e.g., host 782 and server 792.

At least some embodiments of the invention are related to the use of computer system 700 for implementing some or all of the techniques described herein. According to an embodiment of the invention, those techniques are performed by computer system 700 in response to processor 702 executing one or more sequences of one or more processor instructions contained in memory 704. Such instructions, also called computer instructions, software and program code, may be read into memory 704 from another computer-readable medium such as storage device 708 or network link 778. Execution of the sequences of instructions contained in memory 704 causes processor 702 to perform one or more of the method steps described herein. In alternative embodiments, hardware, such as ASIC 720, may be used in place of or in combination with software to implement the invention. Thus, embodiments of the invention are not limited to any specific combination of hardware and software, unless otherwise explicitly stated herein.

The signals transmitted over network link 778 and other networks through communications interface 770, carry information to and from computer system 700. Computer system 700 can send and receive information, including program code, through the networks 780, 790 among others, through network link 778 and communications interface 770. In an example using the Internet 790, a server host 792 transmits program code for a particular application, requested by a message sent from computer 700, through Internet 790, ISP equipment 784, local network 780 and communications interface 770. The received code may be executed by processor 702 as it is received, or may be stored in memory 704 or in storage device 708 or any other non-volatile storage for later execution, or both. In this manner, computer system 700 may obtain application program code in the form of signals on a carrier wave.

Various forms of computer readable media may be involved in carrying one or more sequence of instructions or data or both to processor 702 for execution. For example, instructions and data may initially be carried on a magnetic disk of a remote computer such as host 782. The remote computer loads the instructions and data into its dynamic memory and sends the instructions and data over a telephone line using a modem. A modem local to the computer system 700 receives the instructions and data on a telephone line and uses an infra-red transmitter to convert the instructions and data to a signal on an infra-red carrier wave serving as the network link 778. An infrared detector serving as communications interface 770 receives the instructions and data carried in the infrared signal and places information representing the instructions and data onto bus 710. Bus 710 carries the information to memory 704 from which processor 702 retrieves and executes the instructions using some of the data sent with the instructions. The instructions and data received in memory 704 may optionally be stored on storage device 708, either before or after execution by the processor 702.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
    determining a plurality of terms such that each term comprised by the plurality of terms conveys navigation information along a navigation route;
    determining one or more characters comprised by a term comprised by the plurality of terms that differentiates the term from other terms comprised by the plurality of terms such that the one or more characters differentiate the navigation information conveyed by the term from other navigation information conveyed by the other terms comprised by the plurality of terms;
    determining an abbreviation for the term based on the one or more characters, such that the abbreviation is unambiguous with respect to the other terms comprised by the plurality of terms and the navigation information conveyed by the term is unambiguous with respect to other navigation information conveyed by the other terms comprised by the plurality of terms;
    causing a presentation of a navigation guidance instruction that comprises a representation of the abbreviation;
    determining a different plurality of terms such that each term comprised by the different plurality of terms conveys navigation information along a different navigation route, the different plurality of terms comprising the term;
    determining one or more different characters comprised by the term that differentiates the term from other terms comprised by the different plurality of terms such that the one or more different characters differentiate the navigation information conveyed by the term from other navigation information conveyed by the other terms comprised by the different plurality of terms;
    determining a different abbreviation for the term based on the one or more different characters, such that the different abbreviation is different from the abbreviation and is unambiguous with respect to the other terms comprised by the different plurality of terms and the navigation information conveyed by the term is unambiguous with respect to other navigation information conveyed by the other terms comprised by the different plurality of terms; and
    causing a presentation of a different navigation guidance instruction that comprises a representation of the different abbreviation.

2. A method of claim 1, wherein the one or more characters are a fewest number of starting characters of the term that differentiates the term from the other terms comprised by the plurality of terms.

3. A method of claim 1, further comprising:
    determining a subset of the plurality of terms, including the term, associated with a route segment, wherein the abbreviation for the term is based on the subset of the plurality of terms.

4. A method of claim 3, wherein the route segment is a segment of the navigation route between two navigation guidance instructions.

5. A method of claim 1, wherein the plurality of terms comprise at least one of: one or more streets forming a navigation route, one or more cross streets along the navigation route, one or more landmarks along the navigation route, or one or more points-of-interest along the navigation route.

6. An apparatus comprising:
at least one processor; and
at least one memory including computer program code for one or more programs, wherein the at least one memory and the computer program code are configured to, with the at least one processor, cause the apparatus to at least:
determine a plurality of terms such that each term comprised by the plurality of terms conveys navigation information along a navigation route;
determine one or more characters comprised by a term that differentiates the term from other terms comprised by the plurality of terms such that the one or more characters differentiates the navigation information conveyed by the term from other navigation information conveyed by the other terms comprised by the plurality of terms;
determine an abbreviation for the term based on the one or more characters, such that the abbreviation is unambiguous with respect to the other terms comprised by the plurality of terms and the navigation information conveyed by the term is unambiguous with respect to other navigation information conveyed by the other terms comprised by the plurality of terms;
cause a presentation of a navigation guidance instruction that comprises a representation of the abbreviation;
determine a different plurality of terms such that each term comprised by the different plurality of terms conveys navigation information along a different navigation route, the different plurality of terms comprising the term;
determine one or more different characters comprised by the term that differentiates the term from other terms comprised by the different plurality of terms such that the one or more different characters differentiate the navigation information conveyed by the term from other navigation information conveyed by the other terms comprised by the different plurality of terms;
determine a different abbreviation for the term based on the one or more different characters, such that the different abbreviation is different from the abbreviation and is unambiguous with respect to the other terms comprised by the different plurality of terms and the navigation information conveyed by the term is unambiguous with respect to other navigation information conveyed by the other terms comprised by the different plurality of terms; and
cause a presentation of a different navigation guidance instruction that comprises a representation of the different abbreviation.

7. An apparatus of claim of 6, wherein the one or more characters are a fewest number of starting characters of the term that differentiates the term from the other terms comprised by the plurality of terms.

8. An apparatus of claim of 6, wherein the at least one memory and the computer program code are configured, with the at least one processor, to cause the apparatus to:
determine a subset of the plurality of terms, including the term, associated with a route segment, wherein the abbreviation for the term is based on the subset of the plurality of terms.

9. An apparatus of claim of 8, wherein the route segment is a segment of the navigation route between two navigation guidance instructions.

10. An apparatus of claim of 6, wherein the plurality of terms comprise at least one of: one or more streets forming a navigation route, one or more cross streets along the navigation route, one or more landmarks along the navigation route, or one or more points-of-interest along the navigation route.

11. A computer program product comprising at least one non-transitory computer-readable storage medium having computer-readable program instructions stored therein, the computer-readable program instructions comprising program instructions configured to:
determine a plurality of terms such that each term comprised by the plurality of terms conveys navigation information along a navigation route;
determine one or more characters comprised by a term comprised by the plurality of terms that differentiates the term from other terms comprised by the plurality of terms such that the one or more characters differentiates the navigation information conveyed by the term from other navigation information conveyed by the other terms comprised by the plurality of terms;
determine an abbreviation for the term based on the one or more characters, such that the abbreviation is unambiguous with respect to the other terms comprised by the plurality of terms and the navigation information conveyed by the term is unambiguous with respect to other navigation information conveyed by the other terms comprised by the plurality of terms;
cause a presentation of a navigation guidance instruction that comprises a representation of the abbreviation;
determine a different plurality of terms such that each term comprised by the different plurality of terms conveys navigation information along a different navigation route, the different plurality of terms comprising the term;
determine one or more different characters comprised by the term that differentiates the term from other terms comprised by the different plurality of terms such that the one or more different characters differentiate the navigation information conveyed by the term from other navigation information conveyed by the other terms comprised by the different plurality of terms;
determine a different abbreviation for the term based on the one or more different characters, such that the different abbreviation is different from the abbreviation and is unambiguous with respect to the other terms comprised by the different plurality of terms and the navigation information conveyed by the term is unambiguous with respect to other navigation information conveyed by the other terms comprised by the different plurality of terms; and
cause a presentation of a different navigation guidance instruction that comprises a representation of the different abbreviation.

12. A computer program product of claim 11, wherein the one or more characters are a fewest number of starting characters of the term that differentiates the term from the other terms comprised by the plurality of terms.

13. A computer program product of claim 11, further comprising-program instructions configured to determine a subset of the plurality of terms, including the term, associated with a route segment, wherein the abbreviation for the term is based on the subset of the plurality of terms.

14. A computer program product of claim 13, wherein the route segment is a segment of the navigation route between two navigation guidance instructions.

* * * * *